United States Patent [19]

Marcolongo

[11] 4,322,886
[45] Apr. 6, 1982

[54] TOOL FOR TRIMMING WILLOW TREES

[76] Inventor: Samuel Marcolongo, 131 Pond St., Stoneham, Mass. 02180

[21] Appl. No.: 160,949

[22] Filed: Jun. 19, 1980

[51] Int. Cl.³ .............................................. B26B 3/00
[52] U.S. Cl. ........................................ 30/312; 30/318
[58] Field of Search ................ 30/312, 313, 309, 318, 30/116

[56] References Cited

U.S. PATENT DOCUMENTS

| | | | |
|---|---|---|---|
| 1,364,885 | 1/1921 | Morrison | 30/314 |
| 1,730,907 | 10/1929 | Whitmire | 30/318 |
| 1,759,607 | 5/1930 | Dunn | 30/318 |
| 1,760,024 | 5/1930 | Sydnor | 30/318 |
| 1,920,169 | 8/1933 | Briggs | 30/312 |

FOREIGN PATENT DOCUMENTS 20190 of 1900 United Kingdom .................. 30/116
17340 of 1904 United Kingdom .................. 30/116

*Primary Examiner*—Stephen G. Kunin
*Assistant Examiner*—J. T. Zatarga
*Attorney, Agent, or Firm*—E. Thorpe Barrett

[57] ABSTRACT

A tool for trimming the downward hanging foliage of willow trees including a blade secured to a U-shaped handle having an unobstructed central area designed to pass over the torso of the user as it is swung overhead. The distance between the arms of the frame increase with distance from the blade. The dimensions, weight, and balance of the tool are such as to minimize the effort required in trimming.

5 Claims, 3 Drawing Figures

TOOL FOR TRIMMING WILLOW TREES

BACKGROUND OF THE INVENTION

1. Field of the Invention

This invention relates to a method and tool for trimming the ends of downward hanging foliage from willow trees.

2. Description of the Prior Art

Certain varieties of willow trees have naturally drooping limbs with hanging foliage that if untrimmed may reach the ground. It is desirable for a number of reasons, including simply the appearance, to trim the underside of the foliage and leave several feet of clearance between the ground and the lower ends of the foliage. Many kinds of devices have been provided for trimming plants and weeds along the ground. Other tools, such as pruning shears, are available for trimming branches and leaves of trees. None of these tools has been particularly effective for trimming overhead branches and foliage of willow trees. Pruning shears and similar tools are slow and tedious to use and frequently produce an excessively ragged appearance. Tools designed for ground trimming are not satisfactory for overhead trimming, generally because of weight, balance, frame shape and dimensions. A user attempting to trim the hanging branches of willow trees with such a tool would quickly be exhausted.

BRIEF SUMMARY OF THE INVENTION

An improved tool and method makes possible rapid and effective trimming of downward hanging foliage of willow trees with minimum effort and skill by the person performing the task. A trimming blade is connected at each end to a generally U-shaped frame that has an unobstructed area which permits the user to swing the blade overhead while the two arms of the frame pass on either side of the user. The weight, center of gravity, shape and dimensions of the tool are such as to minimize the physical exertion required for the task.

In use, the frame members of the trimmer are grasped in the hands, near or at the extreme end from the blade, and lifted upwardly and back over the head of the user. The trimmer is then whipped forward with a quick over-head stroke that trims the branches directly above the user. The blade must be wide enough to cut an effective swath, but not so wide it bogs down and doesn't cut all the way through. The blade and tool must be light in weight, but the blade end of the tool must have sufficient mass that the inertia resulting from the velocity acquired before the blade makes contact with the foliage is sufficient to permit completion of the cutting stroke.

DESCRIPTION OF THE PREFERRED EMBODIMENT

Figure 1:
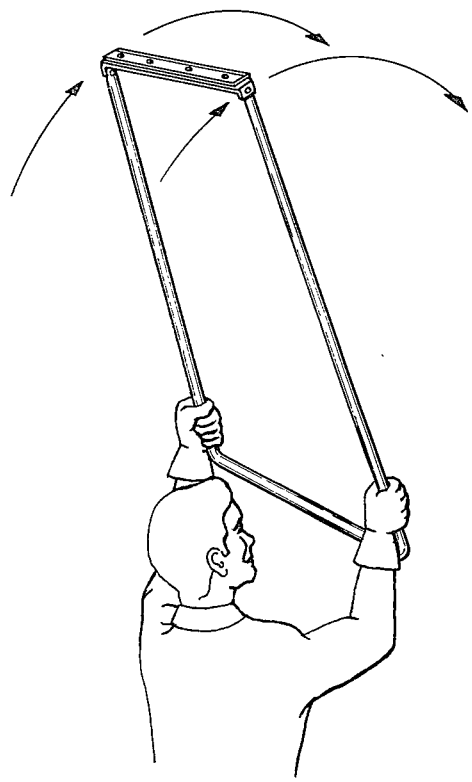
FIG. 1 shows a preferred embodiment of the invention and its method of use in trimming the hanging foliage from a willow tree.
Figure 2:
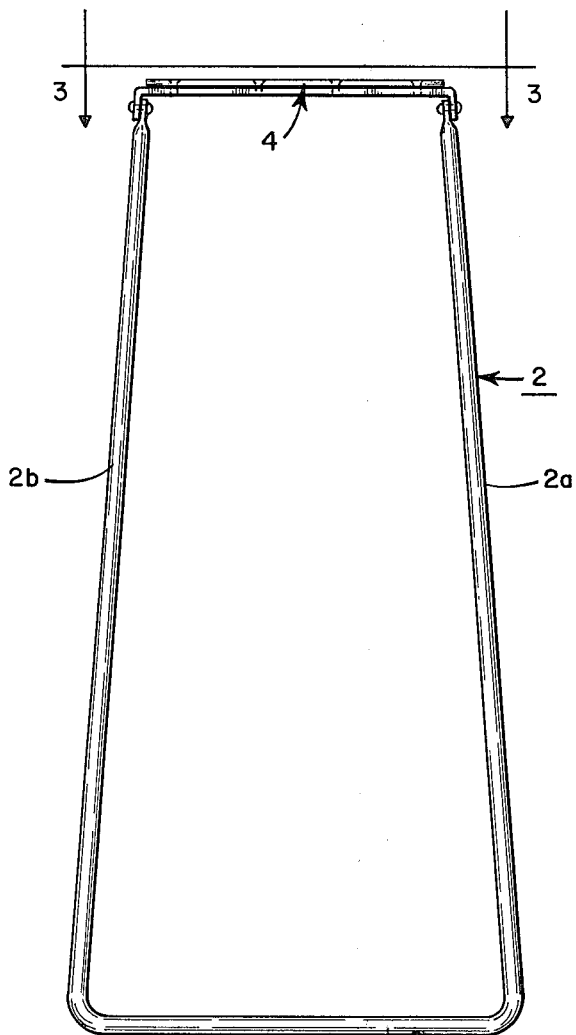
FIG. 2 is a side view of the tool shown in FIG. 1.
Figure 3:
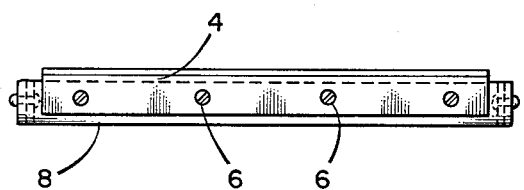
FIG. 3 is an enlarged end view taken along line 3—3 of FIG. 2.

As shown in FIG. 2, the trimming tool comprises a generally U-shaped frame, generally indicated at 2, that supports a trimming blade 4. The trimming blade is removably secured by screws 6 (FIG. 3) to a steel blade support member 8. The frame 2 includes two arms 2a and 2b, that extend outwardly at an angle from the ends of the blade support member 8, and an end frame member 2c.

In application of the trimmer, the user grasps the two arms 2a and 2b at the bottom end, as described above, and swings the trimming blade overhead to engage the downward hanging foliage of the willow tree. Since the arms 2a and 2b pass on either side of the torso of the user as the blade is swung forward and overhead, it is important that the area encompassed by the frame 2 and the blade support member 8 be unobstructed by cross braces or other obstacles.

To be effective in such use, several inter-relating elements of construction are important. For example, the length of the trimming blade should be long enough to permit rapid trimming of the foliage, but yet not so long that excessive momentum is required to complete the stroke of the blade. To this end, the length of the blade 4 should be between nine inches (22.9 cm.) and sixteen inches (40.7 cm.), with a preferred length of about twelve inches (30.5 cm.).

If it is attempted to compensate for a longer blade by increasing the available momentum through increased weight at the cutting end of the tool, the user will tire too quickly to work at maximum effectiveness and, in addition, the hazard of using the tool is increased. The latter consideration arises because, if the trimming blade is accelerated to the velocity required for effective cutting, and is not substantially reduced by the energy required to trim the foliage, the forward momentum of the trimmer blade must be opposed by a counter force applied by the user to prevent the blade from continuing on its arcuate path and striking the body of the user. Continued application of such a large stopping force is a needless waste of the energy of the user.

Since the tool is intended for overhead use, both the weight and the weight distribution are particularly important. It is preferred that the overall weight of the unit be less than two pounds (907 gr.). It has been found that by forming the frame 2 of 0.75 inch (1.9 cm.) OD aluminum tubing, a unit having an overall weight of 19 ounces (539 gr.) can be constructed with the requisite strength for its intended use. The balance, as controlled by the weight distribution, should be such as to provide maximum effectiveness with minimum exertion. To that end, the longitudinal center of gravity of the tool preferably is nearer to the blade 4 than it is to the frame end 2c. In a preferred embodiment, the center of gravity is about sixteen inches (40.6 cm.) from the blade 4 and twenty-two inches (55.9 cm.) from the frame end 2c. It is preferred for best operation that the longitudinal center of gravity be between 14 and 20 inches from the blade 4. The overall length of thirty-eight inches (96.5 cm.) is an ideal length, but any dimension between thirty inches (76.2 cm.) and forty-six inches (116.8 cm.) may be used satisfactorily. A shorter dimension interferes with swinging the tool over the torso and a longer dimension makes the tool awkward to use particularly under willow trees having lower hanging foliage.

To permit maximum freedom in swinging the tool, while providing the requisite strength with minimum weight, the arms 2a and 2b diverge symmetrically from the ends of the blade support member 8 to the point where they join the ends of the frame member 2c. Using a twelve inch (30.5 cm.) blade support and an overall length of about 38 inches (96.5 cm.), the arms 2b and 2c are spaced about seventeen inches apart at the points where they join the end frame member 2c. The angle between the blade support 8 and each of the arms 2b and 2c is about 93.75°, and preferably is between 92.25° and 97.5°. The distance between the two arms 2b and 2c measured at their midpoints should be between 12 and 24 inches (30.5 to 61 cm.).

The blade 4 is preferably readily removable from the blade support 8 so that it can be easily sharpened or replaced. To that end, the blade support 8 consists of a flat steel member having downward extending ears 10a and 10b at its ends which are securely riveted to flattened end portions of each frame arm as indicated at 12a and 12b. The trimming blade is secured to the support 8 by the four screws 6 that pass through openings in the blade 4 and are in threaded engagement with the support 8. A sharpened edge 4a of the trimming blade 4 extends forward of the edge of the blade support 8 by about ⅜ inch (1 cm.).

The tool constructed in the manner described advantageously fills a need recognized by every owner of a willow tree with downwardly hanging foliage. Moreover, the trimmer so provided is low in cost, easily manufactured by ordinary fabrication techniques from readily available materials, and is efficient and effective in its intended use.

I claim:

1. A tool for manually trimming willow trees and adapted for overhead use comprising a generally U-shaped frame having
    a base portion and
    two arms lying in a common first plane extending from said base portion, the distance between said arms at their midpoints being between 12 and 24 inches, and
    a cutting blade extending between the ends of said arms opposite from said base portion, said cutting blade having a sharpened edge and a planar surface extending therefrom lying in a second plane substantially perpendicular to said first plane, the space between said arms being free from obstructions thereby to enable the tool to be swung over the torso of the user.

2. A tool as claimed in claim 1 wherein each of said arms extends outwardly at an angle greater than ninety degrees from the longitudinal axis of said blade.

3. A tool as claimed in claim 2 wherein
    said angle for each of said arms is between 92.2° and 97.5°.

4. A tool as claimed in claim 1 wherein
    said arms diverge from said blade and are separated at the juncture with said base by a distance between two and six inches greater than the separation at the juncture with said blade.

5. A tool as claimed in claim 4 wherein
    the longitudinal center of gravity is nearer to said blade than to said base portion.

* * * * *